(12) United States Patent
Hu (10) Patent No.: US 12,526,856 B2
(45) Date of Patent: Jan. 13, 2026

(54) SESSION ESTABLISHMENT METHOD AND APPARATUS, SYSTEM, AND COMPUTER STORAGE MEDIUM (71) Applicant: HUAWEI TECHNOLOGIES CO., LTD., Shenzhen (CN)

(72) Inventor: Xiang Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 427 days.

(21) Appl. No.: 18/067,934

(22) Filed: Dec. 19, 2022

(65) Prior Publication Data
US 2023/0156828 A1 May 18, 2023

Related U.S. Application Data

(63) Continuation of application No. PCT/CN2021/090946, filed on Apr. 29, 2021.

(30) Foreign Application Priority Data

Jun. 18, 2020 (CN) .......................... 202010578163.3

(51) Int. Cl.
*H04W 76/12* (2018.01)
*H04W 48/18* (2009.01)
(Continued)

(52) U.S. Cl.
CPC .......... *H04W 76/12* (2018.02); *H04W 48/18* (2013.01); *H04W 76/10* (2018.02); *H04L 41/0895* (2022.05); *H04L 41/40* (2022.05)

(58) Field of Classification Search
CPC ..... H04W 76/12; H04W 48/18; H04W 76/10; H04W 88/14; H04W 92/24; H04L 41/0895; H04L 41/40; H04L 41/5051
See application file for complete search history.

(56) References Cited

U.S. PATENT DOCUMENTS

| 11,026,079 | B2 * | 6/2021 | Lee | .......................... H04W 8/08 |
| 2019/0313468 | A1 * | 10/2019 | Talebi Fard | .......... H04W 60/04 |

(Continued)

FOREIGN PATENT DOCUMENTS

| CN | 110830991 A | 2/2020 | |
| EP | 3695639 B1 * | 11/2022 | ........... H04L 43/087 |
| WO | WO-2019184651 A1 * | 10/2019 | ........ H04W 36/0011 |

OTHER PUBLICATIONS

Chinese Office Action issued in corresponding Chinese Application No. 202010578163.3, dated Jan. 11, 2024, pp. 1-12.

(Continued)

*Primary Examiner* — Julio R Perez
(74) *Attorney, Agent, or Firm* — HAUPTMAN HAM, LLP (57) ABSTRACT

A session establishment method, applied to a session management function network element, includes sending a session establishment request to a target user plane function network element. The session establishment request includes first slice information of a target slice instance. The first slice information indicates the target user plane function network element to select the target slice instance from a plurality of slice instances deployed in the target user plane function network element, to perform session establishment processing. The method also includes receiving a session establishment response sent by the target user plane function network element. The method further includes performing session establishment processing based on the session establishment response.

20 Claims, 5 Drawing Sheets

(51) Int. Cl.
  *H04W 76/10* (2018.01)
  *H04L 41/0895* (2022.01)
  *H04L 41/40* (2022.01)

(56) References Cited

U.S. PATENT DOCUMENTS

| | | | |
|---|---|---|---|
| 2020/0053562 A1* | 2/2020 | Kim | H04W 8/02 |
| 2020/0053828 A1 | 2/2020 | Bharatia et al. | |
| 2022/0304109 A1* | 9/2022 | Velev | H04L 12/1407 |
| 2022/0304111 A1* | 9/2022 | Talebi Fard | H04W 80/10 |

OTHER PUBLICATIONS

SA WG2 Meeting #139E S2-2004133, KI#5, New Solution: Slice data rate enforcement and dynamic adjustment, Huawei, HiSilicon, Jun. 1-12, 2020, total 4 pages.

3GPP TS 23.501 V16.4.0 (Mar. 2020), 3rd Generation Partnership Project; Technical Specification Group Services and System Aspects; System architecture for the 5G System (5GS); Stage 2(Release 16), total 430 pages.

Extended European Search Report issued in corresponding European Application No. 21825539.6, dated Nov. 7, 2023, pp. 1-9.

* cited by examiner

SESSION ESTABLISHMENT METHOD AND APPARATUS, SYSTEM, AND COMPUTER STORAGE MEDIUM

CROSS-REFERENCE TO RELATED APPLICATIONS

This application is a continuation of International Application No. PCT/CN2021/090946, filed on Apr. 29, 2021, which claims priority to Chinese Patent Application No. 202010578163.3, filed on Jun. 18, 2020. The disclosures of the aforementioned applications are incorporated herein by reference in these entireties.

TECHNICAL FIELD

The present disclosure relates to the field of wireless communication technologies, and in particular, to a session establishment method and apparatus, a system, and a computer storage medium.

BACKGROUND

In a 5th-generation mobile communication technology (5G), a network architecture of a next-generation core network device is readjusted. A control plane (CP) provides a related function externally by using a service-based interface. The CP and a user plane (UP) exchange messages through an N4/Sx interface, to implement user policy delivery from the CP to the UP and event reporting processing from the UP to the CP. Based on a current 5G network architecture, a session management function (SMF) network element and a user plane function (UPF) complete session establishment through an N4 interface.

In a 5G non-roaming scenario, a session establishment process is considered from a perspective of an N4 interface. A slice type and a slice identifier are unperceived in a session establishment request received by a UPF network element and a processing procedure. Each slice instance is an independent UPF network element. Therefore, in a scenario in which a large quantity of slice instances are deployed, an N4 interface address of a UPF network element that needs to be managed and configured by an SMF network element greatly increases. Consequently, networking and maintenance become more difficult.

SUMMARY

This application provides a session establishment method and apparatus, a system, and a computer storage medium, so that an SMF network element can select and manage a plurality of slice instances deployed in a single UPF network element in a centralized manner.

According to a first aspect, this application provides a session establishment method, applied to an SMF network element. The session establishment method includes:
sending a session establishment request to a target UPF network element, where the session establishment request includes first slice information of a target slice instance, and the first slice information indicates the target UPF network element to select the target slice instance from a plurality of slice instances deployed in the target UPF network element, to perform session establishment processing; and
receiving a session establishment response sent by the target UPF network element, and performing session establishment processing based on the session establishment response.

In this embodiment of this application, a plurality of slice instances can be deployed in a single UPF network element. In addition, in this embodiment of this application, slice information is carried in the session establishment request, so that the SMF network element can select and manage the plurality of slice instances deployed in the single UPF network element in a centralized manner. Therefore, networking and maintenance are simplified.

In an optional implementation, the first slice information includes single network slice selection assistance information (S-NSSAI) of the target slice instance or a network slice instance identifier (NSI ID) of the target slice instance.

In an optional implementation, before the sending a session establishment request to a target UPF network element through a target N4 interface address, the method further includes:
determining the target UPF network element from a plurality of UPF network elements managed by the SMF network element; and
determining the target slice instance from the plurality of slice instances deployed in the target UPF network element.

In an optional implementation, the determining the target UPF network element from a plurality of UPF network elements managed by the SMF network element includes:
obtaining slice instance attributes of the plurality of UPF network elements, where the slice instance attribute of each UPF network element includes one or more running statuses or load information of one or more slice instances deployed in each UPF network element, and a slice instance attribute of at least one UPF network element includes running statuses or load information of a plurality of slice instances deployed in the at least one UPF network element; and
determining the target UPF network element from the plurality of UPF network elements based on the slice instance attributes of the plurality of UPF network elements.

In an optional implementation, the obtaining slice instance attributes of the plurality of UPF network elements includes:
receiving the slice instance attributes reported by the plurality of UPF network elements through an N4 interface address corresponding to the plurality of UPF network elements.

In an optional implementation, the determining the target UPF network element from a plurality of UPF network elements managed by the SMF network element includes:
obtaining second slice information of the plurality of UPF network elements, where the second slice information of each UPF network element includes S-NSSAI or one or more NSI IDs of one or more slice instances deployed in each UPF network element, and second slice information of at least one UPF network element includes S-NSSAI or NSI IDs of a plurality of slice instances deployed in the at least one UPF network element; and
determining the target UPF network element from the plurality of UPF network elements based on the second slice information of the plurality of UPF network elements.

In an optional implementation, the obtaining second slice information of the plurality of UPF network elements includes:
obtaining the second slice information of the plurality of UPF network elements from a network repository function (NRF) network element; or preconfiguring the second slice information of the plurality of UPF network elements via an operations and maintenance (OM) platform.

In an optional implementation, the determining the target slice instance from the plurality of slice instances deployed in the target UPF network element includes:

determining the target slice instance from the target UPF network element based on running statuses or load information of the plurality of slice instances deployed in the target UPF network element; and/or determining the target slice instance from the target UPF network element based on S-NSSAI or NSI IDs of the plurality of slice instances deployed in the target UPF network element.

In an optional implementation, the sending a session establishment request to a target UPF network element includes:

determining a target N4 interface address corresponding to the target UPF network element; and sending the session establishment request to the target UPF network element based on the target N4 interface address.

In the foregoing optional implementations, the SMF network element can select and manage, through a unified N4 interface, the plurality of slice instances deployed in the single UPF network element. In this embodiment of this application, when a new slice instance is deployed in the UPF network element, node-level management and session-level message processing on the newly added slice instance can be implemented without adding to the SMF network element a new N4 interface address for the UPF network element.

According to a second aspect, this application provides a session establishment method, applied to a UPF network element, where a plurality of slice instances are deployed in the UPF network element, and the session establishment method includes:

receiving a session establishment request from an SMF network element, where the session establishment request includes first slice information;

determining a target slice instance from the plurality of slice instances based on the first slice information, and controlling the target slice instance to perform session establishment processing to generate a session establishment response; and sending the session establishment response to the SMF network element, where the session establishment response indicates the SMF network element to perform session establishment processing based on the session establishment response.

In this embodiment of this application, a plurality of slice instances can be deployed in a single UPF network element. In addition, in this embodiment of this application, slice information is carried in the session establishment request, so that the plurality of slice instances deployed in the single UPF network element can be selected and managed in a centralized manner. Therefore, networking and maintenance are simplified.

In an optional implementation, the first slice information includes S-NSSAI or an NSI ID.

In an optional implementation, before the receiving a session establishment request from an SMF network element, the method further includes:

allocating an independent fully qualified tunnel endpoint identifier (F-TEID) range for each of the plurality of slice instances; and the controlling the target slice instance to perform session establishment processing includes:

controlling the target slice instance to perform session establishment processing based on an F-TEID range corresponding to the target slice instance.

In the foregoing optional implementations, an independent F-TEID range is allocated to each of the plurality of slice instances deployed in the single UPF network element, so that session processing and isolation of data forwarding paths between slice instances can be implemented in this embodiment of this application.

According to a third aspect, an embodiment of this application provides a session establishment apparatus, and the apparatus includes an SMF network element. The apparatus may be a network device or a chip in a network device. The session establishment apparatus includes:

a transceiver module, configured to send a session establishment request to a target UPF network element, where the session establishment request includes first slice information of a target slice instance, and the first slice information indicates the target UPF network element to select the target slice instance from a plurality of slice instances deployed in the target UPF network element, to perform session establishment processing.

The transceiver module is further configured to: receive a session establishment response sent by the target UPF network element, and perform session establishment processing based on the session establishment response.

In an optional implementation, the first slice information includes S-NSSAI of the target slice instance or an NSI ID of the target slice instance.

In an optional implementation, the apparatus further includes:

a processing module, configured to determine the target UPF network element from a plurality of UPF network elements managed by the SMF network element.

The processing module is further configured to determine the target slice instance from the plurality of slice instances deployed in the target UPF network element.

In an optional implementation, the transceiver module is further configured to obtain slice instance attributes of the plurality of UPF network elements, where the slice instance attribute of each UPF network element includes one or more running statuses or load information of one or more slice instances deployed in each UPF network element, and a slice instance attribute of at least one UPF network element includes running statuses or load information of a plurality of slice instances deployed in the at least one UPF network element.

When performing the determining the target UPF network element from a plurality of UPF network elements managed by the SMF network element, the processing module is configured to determine the target UPF network element from the plurality of UPF network elements based on the slice instance attributes of the plurality of UPF network elements.

In an optional implementation, when performing the obtaining slice instance attributes of the plurality of UPF network elements, the transceiver module is configured to receive the slice instance attributes reported by the plurality of UPF network elements through an N4 interface address corresponding to the plurality of UPF network elements.

In an optional implementation, the transceiver module is further configured to obtain second slice information of the plurality of UPF network elements, where the second slice information of each UPF network element includes S-NS- SAI or one or more NSI IDs of one or more slice instances deployed in each UPF network element, and second slice information of at least one UPF network element includes S-NSSAI or NSI IDs of a plurality of slice instances deployed in the at least one UPF network element.

When performing the determining the target UPF network element from a plurality of UPF network elements managed by the SMF network element, the processing module is configured to determine the target UPF network element from the plurality of UPF network elements based on the second slice information of the plurality of UPF network elements.

In an optional implementation, when performing the obtaining second slice information of the plurality of UPF network elements, the transceiver module is configured to obtain the second slice information of the plurality of UPF network elements from a network repository function NRF network element; or when performing the obtaining second slice information of the plurality of UPF network elements, the transceiver module is configured to preconfigure the second slice information of the plurality of UPF network elements via an OM platform.

In an optional implementation, when performing the determining the target slice instance from the plurality of slice instances deployed in the target UPF network element, the processing module is configured to determine the target slice instance from the target UPF network element based on running statuses or load information of the plurality of slice instances deployed in the target UPF network element; and/or when performing the determining the target slice instance from the plurality of slice instances deployed in the target UPF network element, the processing module is configured to determine the target slice instance from the target UPF network element based on S-NSSAI or NSI IDs of the plurality of slice instances deployed in the target UPF network element.

In an optional implementation, the processing module is further configured to determine a target N4 interface address corresponding to the target UPF network element.

When performing the sending a session establishment request to a target UPF network element, the transceiver module is configured to send the session establishment request to the target UPF network element based on the target N4 interface address.

Based on a same concept, for problem-resolving principles and beneficial effects of the session establishment apparatus, refer to the method in the first aspect and the possible implementations of the first aspect and beneficial effects thereof. Therefore, for implementation of the session establishment apparatus, refer to the method in the first aspect and the possible implementations of the first aspect. Repeated parts are not described again.

According to a fourth aspect, an embodiment of this application provides a session establishment apparatus, and the apparatus includes a UPF network element. The apparatus may be a network device or a chip in a network device. The session establishment apparatus includes:

a transceiver module, configured to receive a session establishment request from an SMF network element, where the session establishment request includes first slice information; and a processing module, configured to: determine a target slice instance from a plurality of slice instances based on the first slice information, and control the target slice instance to perform session establishment processing to generate a session establishment response.

The transceiver module is further configured to send the session establishment response to the SMF network element, where the session establishment response indicates the SMF network element to perform session establishment processing based on the session establishment response.

In an optional implementation, the first slice information includes S-NSSAI or an NSI ID.

In an optional implementation, the processing module is further configured to allocate an independent F-TEID range for each of the plurality of slice instances.

When performing the controlling the target slice instance to perform session establishment processing, the processing module is configured to control the target slice instance to perform session establishment processing based on an F-TEID range corresponding to the target slice instance.

Based on a same concept, for problem-resolving principles and beneficial effects of the session establishment apparatus, refer to the method in the second aspect and the possible implementations of the second aspect and beneficial effects thereof. Therefore, for implementation of the session establishment apparatus, refer to the method in the second aspect and the possible implementations of the second aspect. Repeated parts are not described again.

According to a fifth aspect, this application provides a computer-readable storage medium. The computer-readable storage medium stores instructions. When the instructions are run, a network device is enabled to perform the method in the first aspect and the possible implementations of the first aspect and obtain beneficial effects thereof. Repeated parts are not described again.

According to a sixth aspect, this application provides a computer-readable storage medium. The computer-readable storage medium stores instructions. When the instructions are run, a network device is enabled to perform the method in the second aspect and the possible implementations of the second aspect and obtain beneficial effects thereof. Repeated parts are not described again.

According to a seventh aspect, this application provides a communication system. The communication system includes:

an SMF network element, configured to send a session establishment request to a target UPF network element, where the session establishment request includes first slice information; and the target UPF network element, configured to: determine a target slice instance from a plurality of slice instances based on the first slice information, and control the target slice instance to perform session establishment processing to generate a session establishment response.

The SMF network element is further configured to: receive the session establishment response from the target UPF network element, and perform session establishment processing based on the session establishment response.

In this embodiment of this application, a plurality of slice instances can be deployed in a single UPF network element. In addition, in this embodiment of this application, slice information is carried in the session establishment request, so that the SMF network element can select and manage the plurality of slice instances deployed in the single UPF network element in a centralized manner. Therefore, networking and maintenance are simplified.

DESCRIPTION OF EMBODIMENTS

Embodiments of this application are described below in detail with reference to the accompanying drawings in embodiments of this application.

Network elements in this application are described below.

A terminal device may include a handheld device, a vehicle-mounted device, a wearable device, or a computing device that have a wireless communication function or another processing device connected to a wireless modem, and user equipment (UE), a mobile station (MS), terminal equipment (TE), and the like that are in various forms.

Main functions of an SMF network element include session related functions, for example, session management (for example, session establishment, modification, and release, including tunnel maintenance between a UPF and a RAN), selection and control of the UPF, service and session continuity (SSC) mode selection, and roaming A UPF network element is a user plane function network element, and may be connected to an external data network. Main functions include user plane related functions, for example, data packet routing and transmission, packet detection, service usage reporting, QoS processing, lawful interception, uplink packet detection, and downlink data packet storage.

Main functions of a mobility management function (AMF) network element include access and mobility related functions, for example, connection management, mobility management, registration management, access authentication and authorization, reachability management, and security context management.

Main functions of a network repository function (NRF) network element include: service discovery (for example, receiving a network element discovery request from a network element function entity, and feeding back information about a network element entity that needs to be "discovered"), and maintaining information about an available network function entity and a service supported by the available network function entity.

Figure 1:
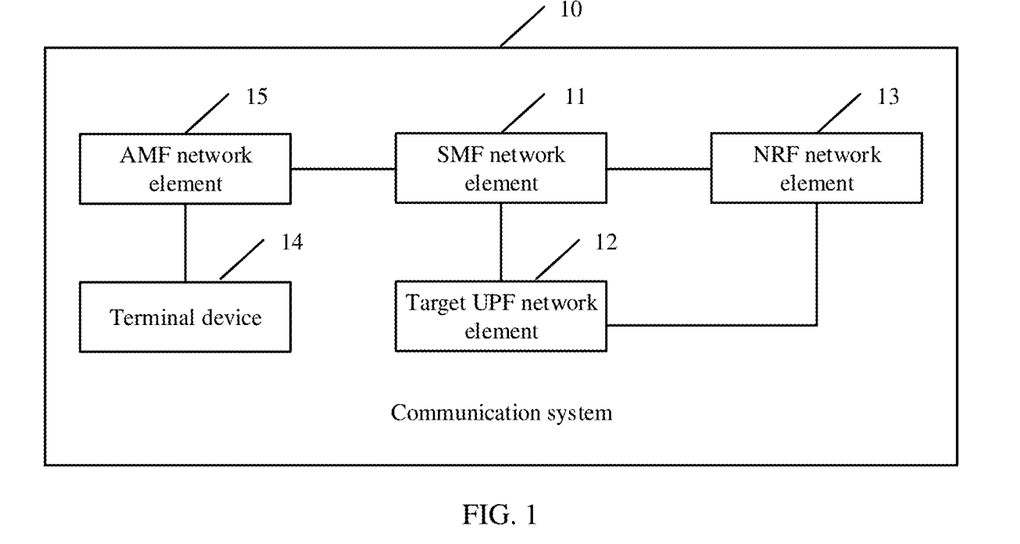
FIG. 1 is a diagram of a network architecture of a communication system according to an embodiment of this application.

FIG. 1 is a diagram of a network architecture of a communication system according to an embodiment of this application. As shown in FIG. 1, the communication system 10 includes an SMF network element 11, a target UPF network element 12, an NRF network element 13, a terminal device 14, and an AMF network element 15. The SMF network element 11, the target UPF network element 12, the NRF network element 13, and the AMF network element 15 are all core network elements.

A single SMF network element 11 may manage one or more first UPF network elements. Each first UPF network element may deploy a plurality of slice instances in one virtual network function (VNF) entity by using a network slice. The plurality of slice instances may have different slice types, to meet different service level agreement (SLA) specification requirements.

In an optional implementation, a manner in which the first UPF network element performs network slicing may include: A communication service management function (CSMF) network element receives a service requirement of a customer, converts the service requirement into a network slice requirement, and sends the network slice requirement to a network slice management function (NSMF) network element. The NSMF network element converts the received network slice requirement into a network slice subnet requirement, and sends the network slice subnet requirement to a network slice subnet management function (NSSMF) network element. The NSSMF network element converts the received network slice subnet requirement into a network function requirement, and sends the network function requirement to a management and orchestration (MANO) network element. The MANO network element performs network service instantiation based on the received network function requirement.

A slice instance may be identified by using a network slice instance identifier (NSI ID) or single network slice selection assistance information (S-NSSAI). The S-NSSAI includes a 1-byte slice/service type (SST) and/or a 3-byte slice differentiator (SD). Values of the SST may be 1, 2, or 3, and respectively indicate that slice types are enhanced mobile broadband (eMBB), ultra-reliable and low latency communication (URLLC), and massive Internet of Things (MIoT). The SD is used to distinguish between different slice instances of a same slice type.

Figure 2:
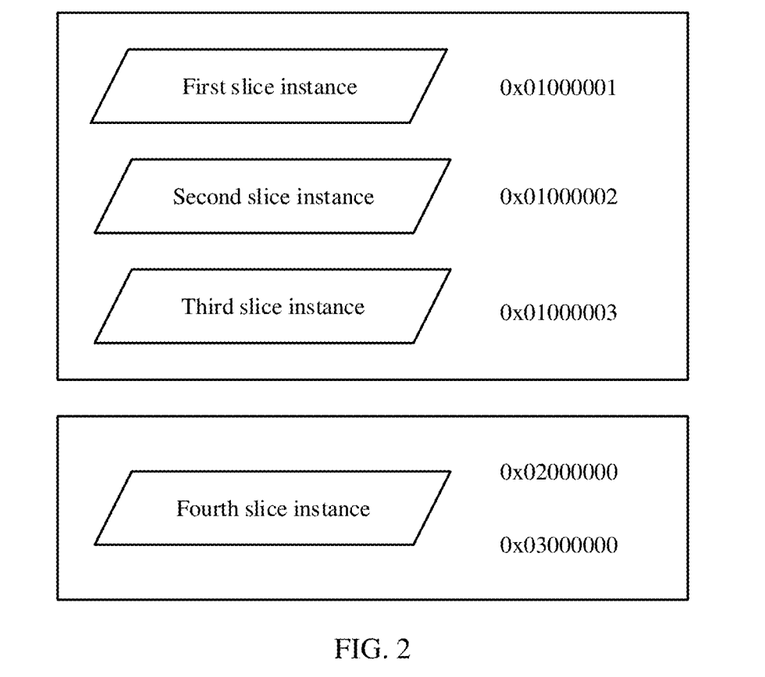
FIG. 2 is a schematic diagram of a multi-slice instance implementation.

One slice instance may have one or more slice types. For example, as shown in FIG. 2, a first slice instance, a second slice instance, and a third slice instance are all eMBB-type slices, and S-NSSAI values of the first slice instance, the second slice instance, and the third slice instance are respectively 0x01000001, 0x01000002, and 0x01000003. A fourth slice instance is both a URLLC-type slice and an MIoT-type slice, and may provide services for both URLLC-type and MIoT-type services. When the fourth slice instance is the URLLC-type slice, an S-NSSAI value of the fourth slice instance is 0x02000000. When the fourth slice instance is the MIoT-type slice, an S-NSSAI value of the fourth slice instance is 0x03000000.

In an optional implementation, the first UPF network element (or a VNF corresponding to the first UPF network element) provides a common N4 interface externally to implement node-level management and session message processing capabilities. For example, the VNF plans a shared N4 interface address for the plurality of slice instances deployed in the first UPF network element to provide a signaling service. Therefore, the first UPF network element does not need to modify an N4 interface configuration when adding or deleting a slice instance. In this implementation, the plurality of slice instances deployed in the first UPF network element are presented externally (for example, to the SMF network element 11) as a common second UPF network element. It may be understood that the second UPF network element and the first UPF network element are a same UPF network element.

Figure 3:
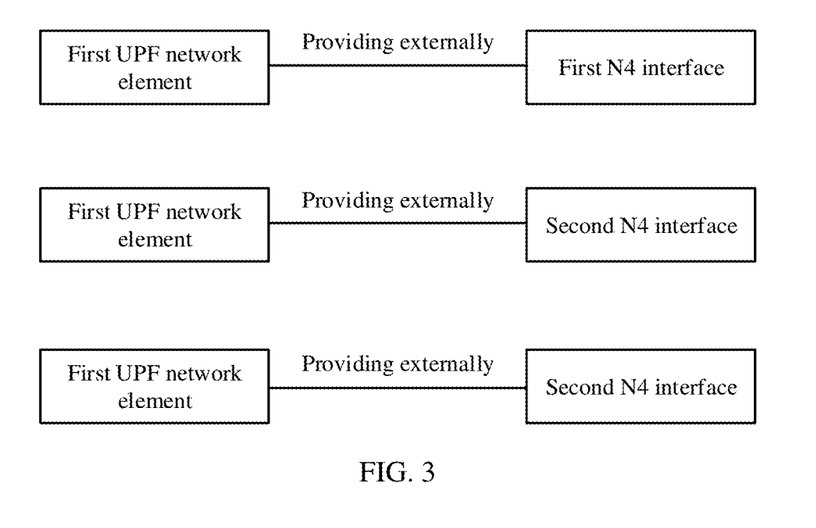
FIG. 3 is a schematic diagram of an N4 interface configuration according to an embodiment of this application.

For example, as shown in FIG. 3, when the SMF network element 11 manages three first UPF network elements, the three first UPF network elements may respectively provide a common first N4 interface, a common second N4 interface, and a common third N4 interface externally.

In another optional implementation, the first UPF network element (or a VNF corresponding to the first UPF network element) provides a plurality of N4 interfaces externally to implement node-level management and session message processing capabilities. For example, the VNF plans a plurality of N4 interfaces for the plurality of slice instances deployed in the first UPF network element to provide a signaling service. In this implementation, the plurality of slice instances deployed in the first UPF network element are presented externally (for example, to the SMF network element 11) as a plurality of second UPF network elements. A quantity of second UPF network elements is the same as a quantity of N4 interfaces provided externally by the VNF, and is less than a quantity of slice instances. In other words, one or more slice instances are deployed in each second UPF network element, and a plurality of slice instances are deployed in at least one second UPF network element.

Figure 4:
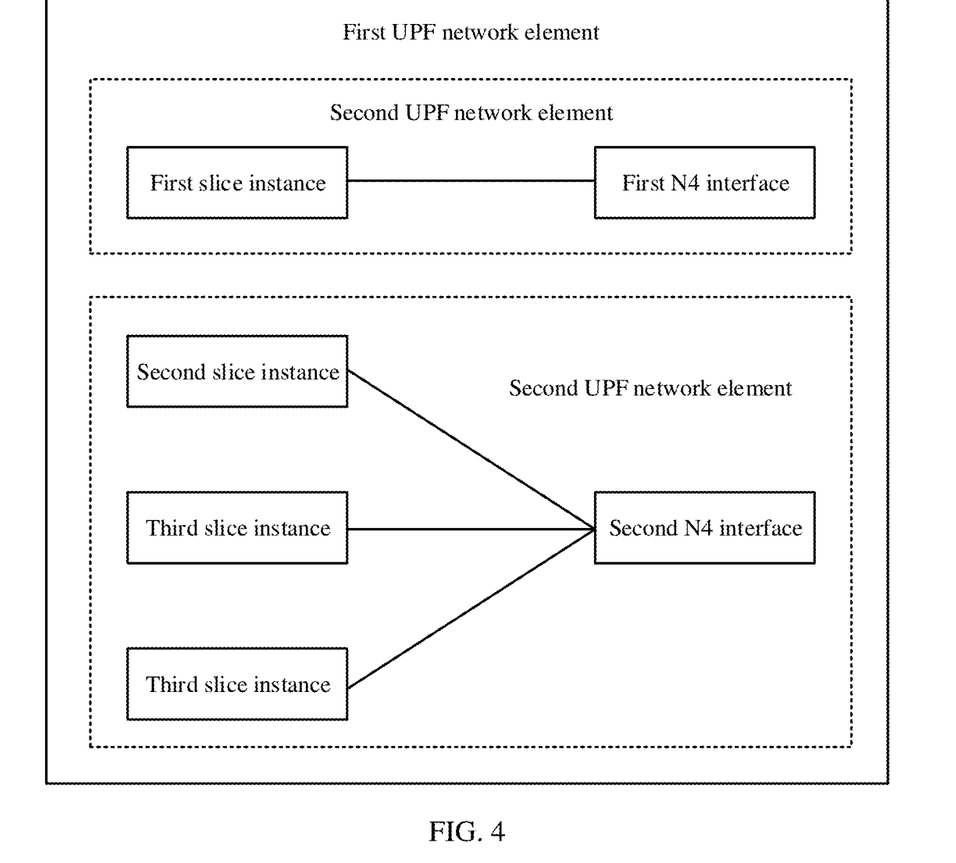
FIG. 4 is a schematic diagram of another N4 interface configuration according to an embodiment of this application.

For example, as shown in FIG. 4, when a first slice instance, a second slice instance, a third slice instance, and a fourth slice instance are deployed in the first UPF network element, if the VNF plans a first N4 interface for the first slice instance to provide a signaling service, and plans a second N4 interface for the second slice instance, the third slice instance, and the fourth slice instance to provide a signaling service, the first slice instance, the second slice instance, the third slice instance, and the fourth slice instance are presented as two second UPF network elements to the SMF network element 11. The two second UPF network elements respectively correspond to the first N4 interface and the second N4 interface, the first slice instance is deployed in one of the two second UPF network elements, and the second slice instance, the third slice instance, and the fourth slice instance are deployed in the other second UPF network element.

It should be noted that the target UPF network element 12 described below in this application is presented as a second UPF network element to the SMF network element 11.

Figure 5:
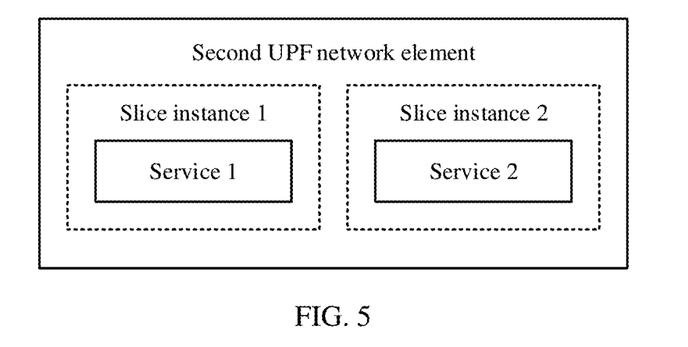
FIG. 5 is a schematic diagram of another multi-slice instance implementation.

In this embodiment of this application, services of a plurality of slice instances deployed in the second UPF network element are independent of each other. Therefore, the plurality of slice instances may relatively independently provide a session management capability and a data forwarding capability. For example, as shown in FIG. 5, when a slice instance 1 and a slice instance 2 are deployed in the second UPF network element, the slice instance 1 and the slice instance 2 independently provide services.

In an optional implementation, the plurality of slice instances deployed in the second UPF network element may share a network element support service (including sharing an enterprise general framework (SCF), a database (DB), a cloud service engine (CSE), an unacknowledged mode (UM) service, a load balance/internet protocol (LB/IP) interface, and the like), and independently provide a service support service.

In another optional implementation, the plurality of slice instances deployed in the second UPF network element may share a network element support service and a service support service.

Further, the second UPF network element may avoid mutual impact between the plurality of slice instances based on session processing and isolation of data forwarding paths in the following different dimensions:

(a) Differentiated deployment modes and performance specifications are planned for service processing units of different slice instances through configuring. For example, independent host (Host) deployment, virtual machine (VM) deployment, and container deployment may be supported physical deployment.

(b) Different virtual private networks (VPNs) and independent N3 addresses and independent N9 addresses are configured and planned for different slice instances, where IP address pools of UE are isolated from each other.

(3) When different slice instances have a same N3 address and a same N9 address, because data plane packets encapsulated by N3 and N9 each are identified by using a fully qualified tunnel endpoint identifier (F-TEID) range, and the F-TEID includes an N3 address, an N9 address, and a TEID, the second UPF network element configures and plans different TEID segments for different slice instances.

In other words, the second UPF network element may allocate independent F-TEID ranges for the plurality of slice instances by configuring and planning independent N3 addresses and independent N9 addresses for different slice instances or configuring and planning different TEID segments for different slice instances.

Figure 6:
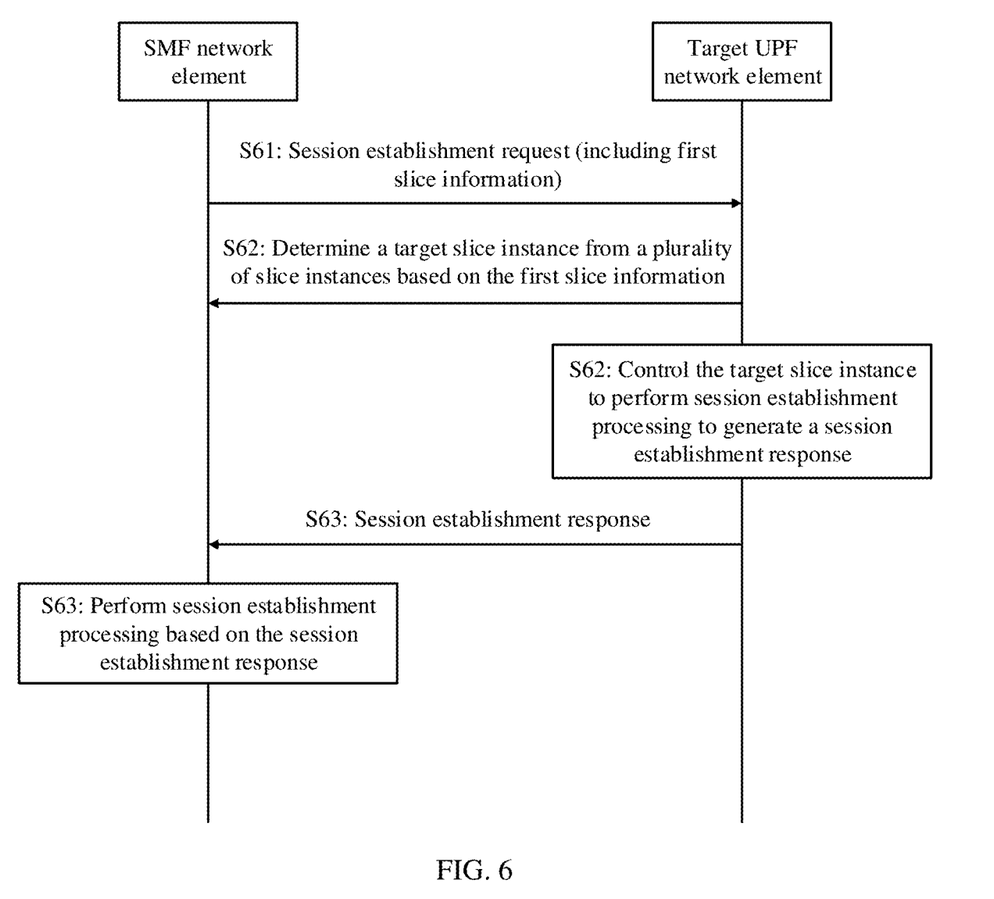
FIG. 6 is a schematic flowchart of a session establishment method according to an embodiment of this application.

Refer to FIG. 1 and FIG. 6. FIG. 6 is a schematic flowchart of a session establishment method according to an embodiment of this application. The session establishment method is applied to the communication system 10 shown in FIG. 1. The session establishment method shown in FIG. 6 may include steps S61 to S63. The steps are described in detail below.

S61: An SMF network element sends a session establishment request to a target UPF network element.

When a session is to be established, a terminal device 14 sends a first protocol data unit (PDU) session establishment request (PDU Session Establishment Request) to an AMF network element 15 through an N1 interface (in other words, over an access network).

When receiving the first PDU session establishment request, the AMF network element 15 sends a second PDU session establishment request Nsmf_PDUSession_CreateSMContext Request to the SMF network element 11.

When receiving the second PDU session establishment request, the SMF network element 11 determines the target UPF network element 12 from a plurality of second UPF network elements managed by the SMF network element 11.

In an optional implementation, that the SMF network element 11 determines the target UPF network element 12 from a plurality of second UPF network elements managed by the SMF network element 11 may include: obtaining slice instance attributes of the plurality of second UPF network elements; and determining the target UPF network element 12 from the plurality of second UPF network elements based on the slice instance attributes of the plurality of second UPF network elements.

The slice instance attribute of each of the plurality of second UPF network elements includes one or more running statuses or load information of one or more slice instances deployed in each of the plurality of second UPF network elements, and a slice instance attribute of at least one second UPF network element includes running statuses or load information of a plurality of slice instances deployed in the at least one second UPF network element (in other words, a plurality of slice instances are deployed in at least one of the plurality of second UPF network elements).

In this embodiment of this application, that the SMF network element 11 obtains slice instance attributes of the plurality of second UPF network elements may include: receiving the slice instance attributes that are reported by the plurality of second UPF network elements through an N4 interface address corresponding to the plurality of second UPF network elements.

The plurality of second UPF network elements may periodically report the slice instance attributes of the plurality of second UPF network elements to the SMF network element 11 through the N4 interface address corresponding to the plurality of second UPF network elements.

For example, that the plurality of second UPF network elements periodically report the slice instance attributes of the plurality of second UPF network elements to the SMF network element 11 through the N4 interface address corresponding to the plurality of second UPF network elements may include: The plurality of second UPF network elements periodically report the slice instance attributes of the plurality of second UPF network elements to the SMF network element 11 by using N4 interface session establishment request messages, N4 interface session modification request messages, N4 interface session establishment response messages, and N4 interface session modification response messages that correspond to the plurality of second UPF network elements. For example, the plurality of second UPF network elements may periodically report, to the SMF network element 11 by using a load control information (Load Control Information) element and an overload control information (Overload Control Information) element in the N4 interface session establishment request messages, the N4 interface session modification request messages, the N4 interface session establishment response messages, and the N4 interface session modification response messages that correspond to the plurality of second UPF network elements, one or more load control policies and one or more overload control policies of the one or more slice instances deployed in the plurality of second UPF network elements.

Alternatively, that the plurality of second UPF network elements periodically report the slice instance attributes of the plurality of second UPF network elements to the SMF network element 11 through the N4 interface address corresponding to the plurality of second UPF network elements may include: The plurality of second UPF network elements extend an information element of a node-level heartbeat message, and periodically maintain NSI ID-based load control information and overload control information.

Therefore, the SMF network element 11 may perceive, by using the N4 interface session response message or the node-level heartbeat message, running statuses and/or load information of the slice instances deployed in the plurality of second UPF network elements. When a slice instance is overloaded, the SMF network element 11 no longer selects a second UPF network element corresponding to the overloaded slice instance to perform session establishment processing, but selects another second UPF network element with light load to perform session establishment processing.

In another optional implementation, that the SMF network element 11 determines the target UPF network element 12 from a plurality of second UPF network elements managed by the SMF network element 11 may include: obtaining second slice information of the plurality of second UPF network elements; and determining the target UPF network element from the plurality of second UPF network elements based on the second slice information of the plurality of second UPF network elements.

The second slice information of each of the plurality of second UPF network elements includes S-NSSAI or one or more NSI IDs of one or more slice instances deployed in each of the plurality of second UPF network elements, and second slice information of at least one second UPF network element includes S-NSSAI or NSI IDs of a plurality of slice instances deployed in the at least one second UPF network element (in other words, a plurality of slice instances are deployed in at least one of the plurality of second UPF network elements).

In this embodiment of this application, that the SMF network element 11 obtains second slice information of the plurality of second UPF network elements may include: obtaining the second slice information of the plurality of second UPF network elements from an NRF network element 13; or preconfiguring the second slice information of the plurality of second UPF network elements via an operations and maintenance (OM) platform.

In an optional implementation, when a VNF provides a common N4 interface externally, the second UPF network element and the first UPF network element are a same UPF network element, before the SMF network element 11 obtains the second slice information of the plurality of second UPF network elements from the NRF network element 13, after completing slice instance deployment, the first UPF network element registers, with the NRF network element 13 based on a deployment status, different service level agreement (SLA) slice identifiers that can be provided by the first UPF network element. The first UPF network element may register, through an Nnrf_NFManagement_NFRegister interface, a slice identifier (for example, S-NSSAI) through which the first UPF network element can provide a service. Therefore, the SMF network element 11 may subscribe to statuses and selection policies of the plurality of second UPF network elements from the NRF network element 13 by using Nnrf_NFManagement_NFStatusSubscribe. Further, the NRF network element 13 may notify the SMF network element 11 of slice identifiers of the plurality of second UPF network elements by using Nnrf_NFManagement_NFStatusNotify.

In another optional implementation, when a VNF provides a plurality of N4 interfaces externally, before the SMF network element 11 obtains the second slice information of the plurality of second UPF network elements from the NRF network element 13, after completing slice instance deployment, the first UPF network element registers, with the NRF network element 13 based on a deployment status, different SLA slice identifiers that can be provided by the first UPF network element and N4 interface addresses corresponding to the different SLA slice identifiers. The first UPF network element may register a slice identifier through which the first UPF network element can provide a service and an N4 interface address corresponding to each slice identifier through an Nnrf_NFManagement_NFRegister interface. Therefore, the SMF network element 11 may subscribe to statuses and selection policies of the plurality of second UPF network elements from the NRF network element 13 by using Nnrf_NFManagement_NFStatusSubscribe. Further, the NRF network element 13 may notify the SMF network element 11 of slice identifiers of the plurality of second UPF network elements and an N4 interface address of the plurality of second UPF network elements by using Nnrf_NFManagement_NFStatusNotify.

When the NRF network element 13 does not implement a service discovery and subscription mechanism of the plurality of UPF network elements, the SMF network element 11 may configure, via the OM platform, an N4 interface address and S-NSSAI ranges that correspond to the plurality of UPF network elements.

When a plurality of slice instances are deployed in the target UPF network element 12, the SMF network element 11 further determines a target slice instance from the plurality of slice instances deployed in the target UPF network element 12.

In an optional implementation, that the SMF network element 11 determines a target slice instance from the plurality of slice instances deployed in the target UPF network element 12 may include: determining the target slice instance from the target UPF network element 12 based on running statuses or load information of the plurality of slice instances deployed in the target UPF network element 12.

In another optional implementation, that the SMF network element 11 determines a target slice instance from the plurality of slice instances deployed in the target UPF network element 12 may include: determining the target slice instance from the target UPF network element 12 based on S-NSSAI or NSI IDs of the plurality of slice instances deployed in the target UPF network element 12.

Further, the SMF network element 11 may determine an N4 interface address corresponding to the target UPF network element 12, and send first slice information of the target slice instance to the target UPF network element 12 based on the N4 interface address. The first slice information may include S-NSSAI of the target slice instance or an NSI ID of the target slice instance.

That the SMF network element 11 sends first slice information of the target slice instance to the target UPF network element 12 may include: sending a packet forwarding control protocol (PFCP) session establishment request (PFCP Session Establishment Request) including the first slice information to the target UPF network element 12.

It may be understood that when only one slice instance is deployed in the target UPF network element 12, the SMF network element 11 may send, to the target UPF network element 12, a PFCP session establishment request that does not include slice information.

S62: The target UPF network element determines the target slice instance from the plurality of slice instances based on the first slice information, and controls the target slice instance to perform session establishment processing to generate a session establishment response.

In this embodiment of this application, the target UPF network element 12 can parse S-NSSAI or an NSI ID included in the PFCP session establishment request, and determine the target slice instance from the plurality of slice instances based on the S-NSSAI or the NSI ID.

That the target UPF network element 12 controls the target slice instance to perform session establishment processing to generate a session establishment response may include: The target UPF network element 12 sends the PFCP session establishment request to the target slice instance. In response to the PFCP session establishment request, the target slice instance establishes a fully qualified session endpoint identifier (F-SEID), an N3 tunnel, and an N9 tunnel that are dedicated to the slice instance, allocates an IP address of UE, and provides slice SLA requirements in forwarding, bandwidth, delay, and the like for subsequent data forwarding, and then returns a PFCP session establishment response (PFCP Session Establishment Response) to the SMF network element 11.

The F-SEID may be, for example, an F-TEID, and the PFCP session establishment response may include the N3 address, the N9 address, the F-TEID, the IP address of the UE, and the like that correspond to the target slice instance.

It may be understood that when only one slice instance is deployed in the target UPF network element 12, the target UPF network element 12 may directly control the slice instance to perform session establishment processing to generate a session establishment response.

S63: The SMF network element receives the session establishment response from the target UPF network element, and performs session establishment processing based on the session establishment response.

That the SMF network element 11 performs session establishment processing based on the session establishment response may include: routing a data plane packet of a user to the target slice instance by using an N3 F-TEID and an N9 F-TEID that correspond to the target slice instance, to perform data processing, and share a corresponding slice service capability.

In this embodiment of this application, a plurality of slice instances can be deployed in a single UPF network element. In addition, in this embodiment of this application, slice information is carried in the session establishment request, so that the SMF network element can select and manage the plurality of slice instances deployed in the single UPF network element in a centralized manner. Therefore, networking and maintenance are simplified. In addition, the SMF network element, can select and manage, through a unified N4 interface, the plurality of slice instances deployed in the single UPF network element. Therefore, in this embodiment of this application, when a new slice instance is deployed in the UPF network element, node-level management and session-level message processing on the newly added slice instance can be implemented without adding to the SMF network element a new N4 interface address for the UPF network element. In addition, an independent F-TEID range is allocated to each of the plurality of slice instances deployed in the single UPF network element, so that session processing and isolation of data forwarding paths between slice instances can be implemented in this embodiment of this application.

Figure 7:
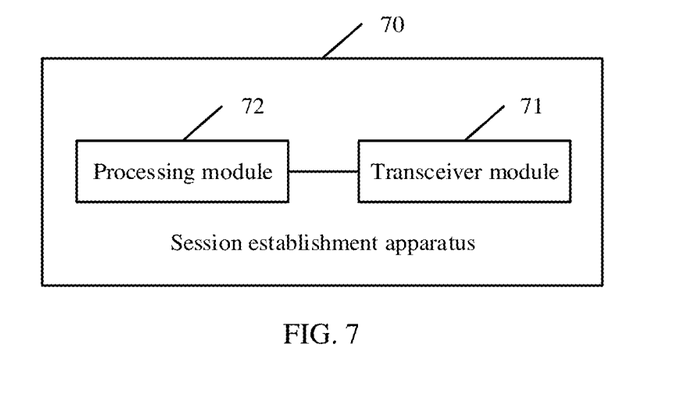
FIG. 7 is a schematic diagram of a framework of a session establishment apparatus according to an embodiment of this application.

FIG. 7 is a schematic diagram of a framework of a session establishment apparatus according to an embodiment of this application. The session establishment apparatus 70 includes an SMF network element. The session establishment apparatus 70 may be a network device or a chip in a network device. As shown in FIG. 7, the session establishment apparatus 70 includes a transceiver module 71 and a processing module 72.

The transceiver module 71 is configured to send a session establishment request to a target UPF network element, where the session establishment request includes first slice information of a target slice instance, and the first slice information indicates the target UPF network element to select the target slice instance from a plurality of slice instances deployed in the target UPF network element, to perform session establishment processing.

The transceiver module 71 is further configured to: receive a session establishment response sent by the target UPF network element, and perform session establishment processing based on the session establishment response.

In an optional implementation, the first slice information includes S-NSSAI of the target slice instance or an NSI ID of the target slice instance.

In an optional implementation, the processing module 72 is configured to: determine the target UPF network element from a plurality of UPF network elements managed by the SMF network element; and determine the target slice instance from the plurality of slice instances deployed in the target UPF network element.

In an optional implementation, the transceiver module 71 is further configured to obtain slice instance attributes of the plurality of UPF network elements, where the slice instance attribute of each UPF network element includes one or more running statuses or load information of one or more slice instances deployed in each UPF network element, and a slice instance attribute of at least one UPF network element includes running statuses or load information of a plurality of slice instances deployed in the at least one UPF network element.

When determining the target UPF network element from the plurality of UPF network elements managed by the SMF network element, the processing module 72 is configured to:
  determine the target UPF network element from the plurality of UPF network elements based on the slice instance attributes of the plurality of UPF network elements.

In an optional implementation, when obtaining the slice instance attributes of the plurality of UPF network elements, the transceiver module 71 is configured to:
  receive the slice instance attributes reported by the plurality of UPF network elements through an N4 interface address corresponding to the plurality of UPF network elements.

In an optional implementation, the transceiver module 71 is further configured to obtain second slice information of the plurality of UPF network elements, where the second slice information of each UPF network element includes S-NSSAI or one or more NSI IDs of one or more slice instances deployed in each UPF network element, and second slice information of at least one UPF network element includes S-NSSAI or NSI IDs of a plurality of slice instances deployed in the at least one UPF network element.

When determining the target UPF network element from the plurality of UPF network elements managed by the SMF network element, the processing module 72 is configured to:
  determine the target UPF network element from the plurality of UPF network elements based on the second slice information of the plurality of UPF network elements.

In an optional implementation, when obtaining the second slice information of the plurality of UPF network elements, the transceiver module 71 is configured to:
  obtain the second slice information of the plurality of UPF network elements from a network repository function NRF network element; or
  preconfigure the second slice information of the plurality of UPF network elements via an operations and maintenance OM platform.

In an optional implementation, when determining the target slice instance from the plurality of slice instances deployed in the target UPF network element, the processing module 72 is configured to:
  determine the target slice instance from the target UPF network element based on running statuses or load information of the plurality of slice instances deployed in the target UPF network element; and/or
  determine the target slice instance from the target UPF network element based on S-NSSAI or NSI IDs of the plurality of slice instances deployed in the target UPF network element.

In an optional implementation, the processing module 72 is further configured to determine a target N4 interface address corresponding to the target UPF network element.

When sending the session establishment request to the target UPF network element, the transceiver module 71 is configured to:
  send the session establishment request to the target UPF network element based on the target N4 interface address.

It should be noted that when the session establishment apparatus 70 is a network device, the processing module 72 may be a processor, and the transceiver module 71 may be a transceiver. The network device may further include a storage module, and the storage module may be a memory. The storage module is configured to store instructions, and the processing module 72 executes the instructions stored in the storage module. When the session establishment apparatus 70 is a chip in a network device, the processing module 72 may be a processor, and the transceiver module 71 may be an input/output interface, a pin, a circuit, or the like. The processing module 72 executes instructions stored in a storage module. The storage module may be a storage module (for example, a register or a cache) in the chip, or may be a storage module (for example, a read-only memory (ROM) or a random access memory (RAM)) that is in the network device and that is located outside the chip.

In this embodiment of this application, a plurality of slice instances can be deployed in a single UPF network element. In addition, in this embodiment of this application, slice information is carried in the session establishment request, so that the SMF network element can select and manage the plurality of slice instances deployed in the single UPF network element in a centralized manner. Therefore, networking and maintenance are simplified. In addition, the SMF network element, can select and manage, through a unified N4 interface, the plurality of slice instances deployed in the single UPF network element. Therefore, in this embodiment of this application, when a new slice instance is deployed in the UPF network element, node-level management and session-level message processing on the newly added slice instance can be implemented without adding to the SMF network element a new N4 interface address for the UPF network element.

Figure 8:
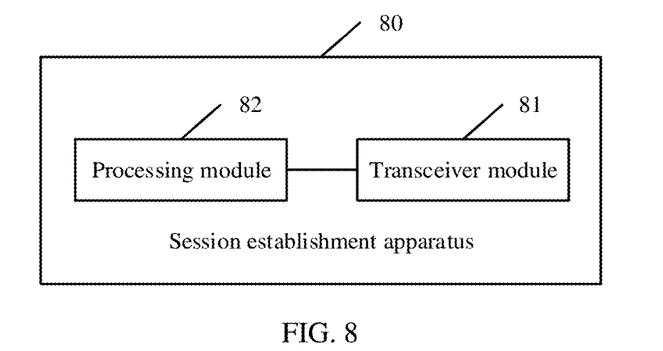
FIG. 8 is a schematic diagram of a framework of another session establishment apparatus according to an embodiment of this application.

FIG. 8 is a schematic framework diagram of another session establishment apparatus according to an embodiment of this application. The session establishment apparatus 80 includes a UPF network element, and a plurality of slice instances are deployed in the UPF network element. The session establishment apparatus 80 may be a network device or a chip in a network device. As shown in FIG. 8, the session establishment apparatus 80 includes a transceiver module 81 and a processing module 82.

The transceiver module 81 is configured to receive a session establishment request from an SMF network element, where the session establishment request includes first slice information.

The processing module 82 is configured to: determine a target slice instance from a plurality of slice instances based on the first slice information, and control the target slice instance to perform session establishment processing to generate a session establishment response.

The transceiver module 81 is further configured to send the session establishment response to the SMF network element, where the session establishment response indicates the SMF network element to perform session establishment processing based on the session establishment response.

In an optional implementation, the first slice information includes S-NSSAI or an NSI ID.

In an optional implementation, the processing module 82 is further configured to allocate an independent fully qualified tunnel endpoint identifier F-TEID range for each of the plurality of slice instances.

When controlling the target slice instance to perform session establishment processing, the processing module 82 is configured to:

control the target slice instance to perform session establishment processing based on an F-TEID range corresponding to the target slice instance.

It should be noted that when the session establishment apparatus 80 is a network device, the processing module 82 may be a processor, and the transceiver module 81 may be a transceiver. The network device may further include a storage module, and the storage module may be a memory. The storage module is configured to store instructions, and the processing module 82 executes the instructions stored in the storage module. When the session establishment apparatus 80 is a chip in a network device, the processing module 82 may be a processor, and the transceiver module 81 may be an input/output interface, a pin, a circuit, or the like. The processing module 82 executes instructions stored in a storage module. The storage module may be a storage module (for example, a register or a cache) in the chip, or may be a storage module (for example, a ROM or a RAM) that is in the network device and that is located outside the chip.

In this embodiment of this application, a plurality of slice instances can be deployed in a single UPF network element. In addition, in this embodiment of this application, slice information is carried in the session establishment request, so that the plurality of slice instances deployed in the single UPF network element can be selected and managed in a centralized manner. Therefore, networking and maintenance are simplified. In addition, an independent F-TEID range is allocated to each of the plurality of slice instances deployed in the single UPF network element, so that session processing and isolation of data forwarding paths between slice instances can be implemented in this embodiment of this application.

Figure 9:
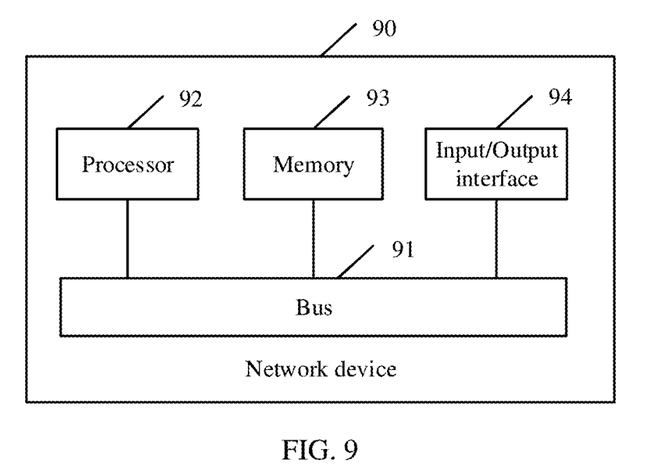
FIG. 9 is a schematic diagram of a framework of a network device according to an embodiment of this application.

FIG. 9 is a schematic diagram of a framework of a network device 90 according to an embodiment of this application. As shown in FIG. 9, the network device 90 may include a bus 91, a processor 92, a memory 93, and an input/output interface 94. The bus 91 is configured to connect the processor 92, the memory 93, and the input/output interface 94 to each other, so that the foregoing elements can communicate with each other. The memory 93 is configured to store one or more computer programs, and the computer program includes computer instructions. The input/output interface 94 is configured to control a communication connection between the network device 90 and another device (for example, a terminal device).

The processor 92 is configured to invoke the computer instructions to perform the following operations:

sending a session establishment request to a target UPF network element, where the session establishment request includes first slice information of a target slice instance, and the first slice information indicates the target UPF network element to select the target slice instance from a plurality of slice instances deployed in the target UPF network element, to perform session establishment processing; and receiving a session establishment response sent by the target UPF network element, and performing session establishment processing based on the session establishment response.

In an optional implementation, the first slice information includes single network slice selection assistance information S-NSSAI of the target slice instance or a network slice instance identifier NSI ID of the target slice instance.

In an optional implementation, before being configured to invoke the computer instructions to perform the sending a session establishment request to a target UPF network element through a target N4 interface address, the processor 92 further performs the following operations:

determining the target UPF network element from a plurality of UPF network elements managed by the SMF network element; and determining the target slice instance from the plurality of slice instances deployed in the target UPF network element.

In an optional implementation, when being configured to invoke the computer instructions to perform the determining the target UPF network element from a plurality of UPF network elements managed by the SMF network element, the processor 92 performs the following operations:

obtaining slice instance attributes of the plurality of UPF network elements, where the slice instance attribute of each UPF network element includes one or more running statuses or load information of one or more slice instances deployed in each UPF network element, and a slice instance attribute of at least one UPF network element includes running statuses or load information of a plurality of slice instances deployed in the at least one UPF network element; and determining the target UPF network element from the plurality of UPF network elements based on the slice instance attributes of the plurality of UPF network elements.

In an optional implementation, when being configured to invoke the computer instructions to perform the obtaining slice instance attributes of the plurality of UPF network elements, the processor 92 performs the following operation:

receiving the slice instance attributes reported by the plurality of UPF network elements through an N4 interface address corresponding to the plurality of UPF network elements.

In an optional implementation, when being configured to invoke the computer instructions to perform the determining the target UPF network element from a plurality of UPF network elements managed by the SMF network element, the processor 92 performs the following operations:

obtaining second slice information of the plurality of UPF network elements, where the second slice information of each UPF network element includes S-NSSAI or one or more NSI IDs of one or more slice instances deployed in each UPF network element, and second slice information of at least one UPF network element includes S-NSSAI or NSI IDs of a plurality of slice instances deployed in the at least one UPF network element; and determining the target UPF network element from the plurality of UPF network elements based on the second slice information of the plurality of UPF network elements.

In an optional implementation, when being configured to invoke the computer instructions to perform the obtaining second slice information of the plurality of UPF network elements, the processor 92 performs the following operation:

obtaining the second slice information of the plurality of UPF network elements from a network repository function NRF network element; or preconfiguring the second slice information of the plurality of UPF network elements via an operations and maintenance OM platform.

In an optional implementation, when being configured to invoke the computer instructions to perform the determining the target slice instance from the plurality of slice instances deployed in the target UPF network element, the processor 92 performs the following operations:

determining the target slice instance from the target UPF network element based on running statuses or load information of the plurality of slice instances deployed in the target UPF network element; and/or determining the target slice instance from the target UPF network element based on S-NSSAI or NSI IDs of the plurality of slice instances deployed in the target UPF network element.

In an optional implementation, when being configured to invoke the computer instructions to perform the sending a session establishment request to a target UPF network element, the processor 92 performs the following operations:

determining a target N4 interface address corresponding to the target UPF network element; and sending the session establishment request to the target UPF network element based on the target N4 interface address.

The processor 92 may be a central processing unit (CPU). The memory 93 may be any type of memory, for example, may be a ROM, a RAM, a nonvolatile random access memory, or the like.

Based on a same concept, problem-resolving principles and beneficial effects of the network device 90 provided in this embodiment of this application are similar to those of the session establishment apparatus embodiment shown in FIG. 7 of this application. Therefore, for implementation of the network device 90, refer to implementation of the session establishment apparatus 70 shown in FIG. 7. Repeated parts are not described again.

Figure 10:
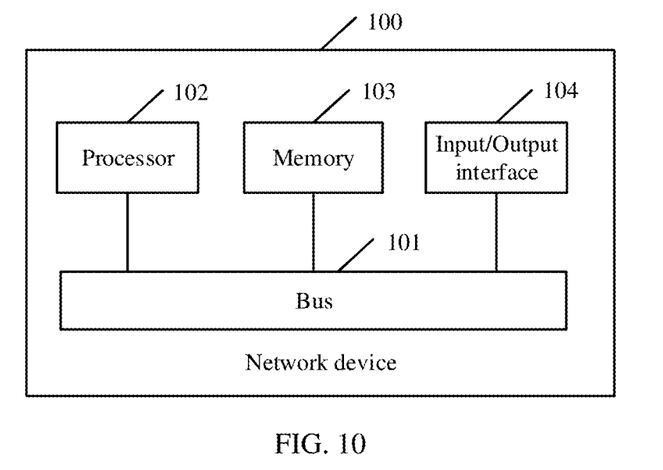
FIG. 10 is a schematic diagram of a framework of another network device according to an embodiment of this application.

FIG. 10 is a schematic diagram of a framework of another network device 100 according to an embodiment of this application. As shown in FIG. 10, the network device 100 may include a bus 101, a processor 102, a memory 103, and an input/output interface 104. The bus 101 is configured to connect the processor 102, the memory 103, and the input/output interface 104 to each other, so that the foregoing elements can communicate with each other. The memory 103 is configured to store one or more computer programs, and the computer program includes computer instructions. The input/output interface 104 is configured to control a communication connection between the network device 100 and another device (for example, a terminal device).

In some embodiments, the processor 102 is configured to invoke the computer instructions to perform the following operations:

receiving a session establishment request from an SMF network element, where the session establishment request includes first slice information;

determining a target slice instance from a plurality of slice instances based on the first slice information, and controlling the target slice instance to perform session establishment processing to generate a session establishment response; and sending the session establishment response to the SMF network element, where the session establishment response indicates the SMF network element to perform session establishment processing based on the session establishment response.

In an optional implementation, the first slice information includes S-NSSAI or an NSI ID.

In an optional implementation, before being configured to invoke the computer instructions to perform the receiving a session establishment request from an SMF network element, the processor 102 further performs the following operation:

allocating an independent fully qualified tunnel endpoint identifier F-TEID range for each of the plurality of slice instances.

When being configured to invoke the computer instructions to perform the controlling the target slice instance to perform session establishment processing, the processor 102 performs the following operation:

controlling the target slice instance to perform session establishment processing based on an F-TEID range corresponding to the target slice instance.

The processor 102 may be a CPU. The memory 103 may be any type of memory, for example, may be a ROM, a RAM, a nonvolatile random access memory, or the like.

Based on a same concept, problem-resolving principles and beneficial effects of the network device 100 provided in this embodiment of this application are similar to those of the session establishment apparatus embodiment shown in FIG. 8 of this application. Therefore, for implementation of the network device 100, refer to implementation of the session establishment apparatus 80 shown in FIG. 8. Repeated parts are not described again.

It may be understood that the accompanying drawings in embodiments of this application show only simplified designs of the foregoing communication apparatuses. In actual application, the foregoing communication apparatuses are not limited to the foregoing structures.

It should be noted that the processor in embodiments of this application may be a CPU, a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The memory may be integrated into the processor, or may be disposed separately from the processor.

An embodiment of this application further provides a chip. The chip is connected to a memory, and is configured to read and execute a software program stored in the memory, to implement any one of the methods in the foregoing method embodiments.

An embodiment of this application further provides a computer storage medium. The computer storage medium stores computer-readable instructions. When reading and executing the computer-readable instructions, a computer may complete any one of the methods in the foregoing method embodiments.

An embodiment of this application further provides a computer program product including a software program. When the computer program product is run on a computer, the computer is enabled to perform any one of the methods in the foregoing method embodiments.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer instructions.

The objectives, technical methods, and beneficial effects of this application have been described in detail in the foregoing embodiments. It should be understood that the foregoing descriptions are only example implementations of this application, and are not intended to limit the protection scope of this application. Any modifications and variations made on the basis of the technical solutions of this application shall fall within the protection scope of this application.

What is claimed is:

1. A session establishment method, applied to a session management function network element, wherein the method comprises:
    sending a session establishment request to a target user plane function network element, wherein the session establishment request comprises first slice information of a target slice instance, and the first slice information indicates the target user plane function network element to select the target slice instance from a plurality of slice instances deployed in the target user plane function network element, to perform session establishment processing;
    receiving a session establishment response sent by the target user plane function network element; and
    performing session establishment processing based on the session establishment response.

2. The session establishment method according to claim 1, wherein the first slice information comprises single network slice selection assistance information of the target slice instance or a network slice instance identifier of the target slice instance.

3. The session establishment method according to claim 1, wherein before the sending the session establishment request to the target user plane function network element, the method further comprises:
    determining the target user plane function network element from a plurality of user plane function network elements managed by the session management function network element; and
    determining the target slice instance from the plurality of slice instances deployed in the target user plane function network element.

4. The session establishment method according to claim 3, wherein the determining the target user plane function network element from the plurality of user plane function network elements managed by the session management function network element comprises:
    obtaining slice instance attributes of the plurality of user plane function network elements, wherein the slice instance attribute of each user plane function network element comprises one or more running statuses or load information of one or more slice instances deployed in each user plane function network element, and the slice instance attribute of at least one user plane function network element comprises running statuses or load information of a plurality of slice instances deployed in the at least one user plane function network element; and
    determining the target user plane function network element from the plurality of user plane function network elements based on the slice instance attributes of the plurality of user plane function network elements.

5. The session establishment method according to claim 4, wherein the obtaining slice instance attributes of the plurality of user plane function network elements comprises:
    receiving the slice instance attributes reported by the plurality of user plane function network elements through an N4 interface address corresponding to the plurality of user plane function network elements.

6. The session establishment method according to claim 3, wherein the determining the target user plane function network element from the plurality of user plane function network elements managed by the session management function network element comprises:
    obtaining second slice information of the plurality of user plane function network elements, wherein the second slice information of each user plane function network element comprises single network slice selection assistance information or one or more network slice instance identifiers of one or more slice instances deployed in each user plane function network element, and second slice information of at least one user plane function network element comprises single network slice selection assistance information or network slice instance identifiers of a plurality of slice instances deployed in the at least one user plane function network element; and
    determining the target user plane function network element from the plurality of user plane function network elements based on the second slice information of the plurality of user plane function network elements.

7. The session establishment method according to claim 6, wherein the obtaining second slice information of the plurality of user plane function network elements comprises:
    obtaining the second slice information of the plurality of user plane function network elements from a network repository function network element.

8. The session establishment method according to claim 6, wherein the obtaining second slice information of the plurality of user plane function network elements comprises:
    preconfiguring the second slice information of the plurality of user plane function network elements via an operations and maintenance platform.

9. The session establishment method according to claim 3 wherein the determining the target slice instance from the plurality of slice instances deployed in the target user plane function network element comprises one or more of:
    determining the target slice instance from the target user plane function network element based on running statuses or load information of the plurality of slice instances deployed in the target user plane function network element; or
    determining the target slice instance from the target user plane function network element based on single network slice selection assistance information or network slice instance identifiers of the plurality of slice instances deployed in the target user plane function network element.

10. The session establishment method according to claim 3, wherein the sending a session establishment request to a target user plane function network element comprises:
   determining a target N4 interface address corresponding to the target user plane function network element; and
   sending the session establishment request to the target user plane function network element based on the target N4 interface address.

11. An apparatus, comprising:
   a processor; and
   a non-transitory computer-readable storage medium storing instructions that, when executed by the processor, cause the apparatus to:
   send a session establishment request to a target user plane function network element, wherein the session establishment request comprises first slice information of a target slice instance, and the first slice information indicates the target user plane function network element to select the target slice instance from a plurality of slice instances deployed in the target user plane function network element, to perform session establishment processing;
   receive a session establishment response sent by the target user plane function network element, and
   perform session establishment processing based on the session establishment response.

12. The apparatus according to claim 11, wherein the first slice information comprises single network slice selection assistance information of the target slice instance or a network slice instance identifier of the target slice instance.

13. The apparatus according to claim 11, wherein the apparatus is further caused to:
   before sending the session establishment request to the target user plane function network element, determine the target user plane function network element from a plurality of user plane function network elements managed by the apparatus; and
   determine the target slice instance from the plurality of slice instances deployed in the target user plane function network element.

14. The apparatus according to claim 13, wherein the apparatus is further caused to:
   obtain slice instance attributes of the plurality of user plane function network elements, wherein the slice instance attribute of each user plane function network element comprises one or more running statuses or load information of one or more slice instances deployed in each user plane function network element, and the slice instance attribute of at least one user plane function network element comprises running statuses or load information of a plurality of slice instances deployed in the at least one user plane function network element; and
   determine the target user plane function network element from the plurality of user plane function network elements based on the slice instance attributes of the plurality of user plane function network elements.

15. The apparatus according to claim 14, wherein the apparatus is further caused to:
   receive the slice instance attributes reported by the plurality of user plane function network elements through an N4 interface address corresponding to the plurality of user plane function network elements.

16. The apparatus according to claim 13, wherein the apparatus is further caused to:
   obtain second slice information of the plurality of user plane function network elements, wherein the second slice information of each user plane function network element comprises single network slice selection assistance information or one or more network slice instance identifiers of one or more slice instances deployed in each user plane function network element, and second slice information of at least one user plane function network element comprises single network slice selection assistance information or network slice instance identifiers of a plurality of slice instances deployed in the at least one user plane function network element; and
   determine the target user plane function network element from the plurality of user plane function network elements based on the second slice information of the plurality of user plane function network elements.

17. The apparatus according to claim 16, wherein the apparatus is further caused to:
   obtain the second slice information of the plurality of user plane function network elements from a network repository function network element; or
   preconfigure the second slice information of the plurality of user plane function network elements via an operations and maintenance platform.

18. The apparatus according to claim 13, wherein the apparatus is further caused to one or more of:
   determine the target slice instance from the target user plane function network element based on running statuses or load information of the plurality of slice instances deployed in the target user plane function network element; or
   determine the target slice instance from the target user plane function network element based on single network slice selection assistance information or network slice instance identifiers of the plurality of slice instances deployed in the target user plane function network element.

19. The apparatus according to claim 13, wherein the apparatus is further caused to:
   determine a target N4 interface address corresponding to the target user plane function network element; and
   send the session establishment request to the target user plane function network element based on the target N4 interface address.

20. A communication system, comprising:
   a session management function network element; and
   a user plane function network element, wherein
   a plurality of slice instances are deployed in the user plane function network element,
   the session management function network element is configured to:
      send a session establishment request to a target user plane function network element, wherein the session establishment request comprises first slice information of a target slice instance, and the first slice information indicates the target user plane function network element to select the target slice instance from a plurality of slice instances deployed in the target user plane function network element, to perform session establishment processing;
      receive a session establishment response sent by the target user plane function network element; and
      perform session establishment processing based on the session establishment response, and
   the user plane function network element is configured to:
      receive a session establishment request from the session management function network element, wherein the session establishment request comprises the first slice information;
determine a target slice instance from the plurality of slice instances based on the first slice information;
control the target slice instance to perform session establishment processing to generate a session establishment response; and
send the session establishment response to the session management function network element, wherein the session establishment response indicates the session management function network element to perform session establishment processing based on the session establishment response.

* * * * *